(12) United States Patent
Ho

(10) Patent No.: US 12,118,709 B2
(45) Date of Patent: Oct. 15, 2024

(54) METHOD FOR IDENTIFYING CAUSE OF MANUFACTURING DEFECTS

(71) Applicant: NANYA TECHNOLOGY CORPORATION, New Taipei (TW)

(72) Inventor: Ken-Huan Ho, Taipei (TW)

(73) Assignee: NANYA TECHNOLOGY CORPORATION, New Taipei (TW)

(*) Notice: Subject to any disclaimer, the term of this patent is extended or adjusted under 35 U.S.C. 154(b) by 374 days.

(21) Appl. No.: 17/678,184

(22) Filed: Feb. 23, 2022

(65) Prior Publication Data

US 2023/0267595 A1    Aug. 24, 2023

(51) Int. Cl.
*G06T 7/00* (2017.01)

(52) U.S. Cl.
CPC .. *G06T 7/0006* (2013.01); *G06T 2207/30148* (2013.01)

(58) Field of Classification Search
CPC ......... G06T 7/0006; G06T 2207/30148; G06T 7/0004; G06T 7/60; H01L 22/12; H01L 22/24; G01B 11/002
See application file for complete search history.

(56) References Cited

U.S. PATENT DOCUMENTS

| | | |
|---|---|---|
| 6,539,106 B1 | 3/2003 | Gallarda et al. |
| 2011/0280470 A1 | 11/2011 | Hayashi |
| 2012/0149135 A1 | 6/2012 | Sugimura et al. |
| 2014/0118730 A1 | 5/2014 | Kavaldjiev et al. |
| 2014/0343884 A1 | 11/2014 | Leu |
| 2020/0072760 A1 | 3/2020 | Shih et al. |
| 2021/0320037 A1 | 10/2021 | Lee |
| 2021/0334946 A1* | 10/2021 | Buzaglo ............ G06T 7/90 |
| 2022/0277434 A1 | 9/2022 | Yumiba et al. |
| 2022/0375195 A1 | 11/2022 | Sugihara |

FOREIGN PATENT DOCUMENTS

| | | |
|---|---|---|
| TW | 201742115 A | 12/2017 |
| TW | 201814873 A | 4/2018 |
| TW | 201832304 A | 9/2018 |
| TW | 201923658 A | 6/2019 |
| TW | 202109701 A | 3/2021 |
| TW | 20213348 A | 4/2021 |
| TW | 202205490 A | 2/2022 |
| TW | 202205654 A | 2/2022 |
| WO | WO-2018/064885 A1 | 4/2018 |

* cited by examiner

*Primary Examiner* — Roy M Punnoose
(74) *Attorney, Agent, or Firm* — Muncy, Geissler, Olds & Lowe, P.C.

(57) ABSTRACT

A method for identifying a cause of manufacturing defects is provided. The method includes capturing, by an image capture unit, a number N of images from a semiconductor wafer, wherein each of the s umber N of images comprises a number M of geometric features, calculating, by a processing unit, a geometric center for each of the geometric features of the number N of images, calculating, based on the number N of images, a number M of average geometric centers associated with the number M of geometric features, and calculating a shift amount for each geometric feature of the number N of images.

10 Claims, 25 Drawing Sheets

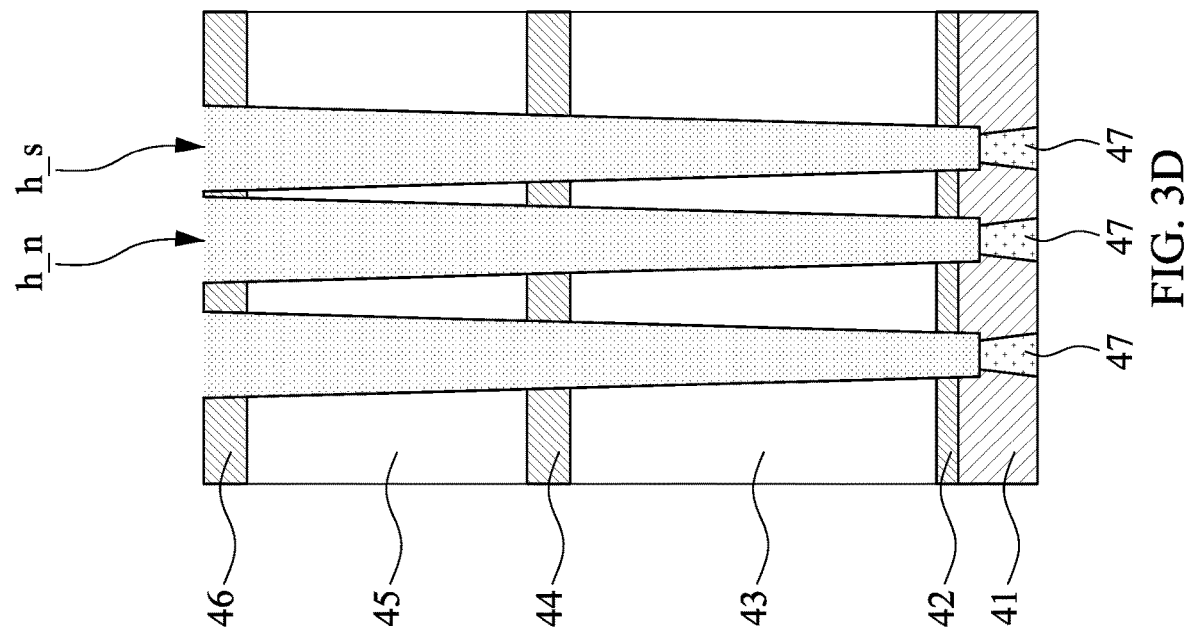

METHOD FOR IDENTIFYING CAUSE OF MANUFACTURING DEFECTS

TECHNICAL FIELD

The present disclosure relates to a method of semiconductor manufacture, and more particularly, to a method for identifying the cause of manufacturing defects.

DISCUSSION OF THE BACKGROUND

Self-aligned double patterning (SADP) is a technique for doubling the pitch of line patterns, which can also be applied to form hole patterns. Cross SADP (X-SADP) is a hole-forming method in which an orthogonal spacer pattern is formed over the first line pattern that was formed by SADP. X-SADP can be utilized to form regularly-arranged hole patterns. Nevertheless, due to variations in manufacturing process, unexpected shifts may be observed from the hole patterns formed by X-SADP. Conventionally, the hole patterns formed by X-SADP can be checked by optical inspection equipment for undesired shifts. Nevertheless, this conventional mechanism cannot distinguish the root cause of the unexpected shifts. Therefore, a new inspection method and system is proposed.

This Discussion of the Background section is provided for background information only. The statements in this Discussion of the Background are not an admission that the subject matter disclosed herein constitutes prior art with respect to the present disclosure, and no part of this Discussion of the Background may be used as an admission that any part of this application constitutes prior art with respect to the present disclosure.

SUMMARY

One aspect of the present disclosure provides a system for identifying a cause of manufacturing defects. The system includes a processing unit and an image capture unit electrically coupled to the processing unit. The system is configured to capture, via the image capture unit, a number N of images covering different portions of a to semiconductor wafer, wherein each of the umber N of images comprises a number M of geometric features. The system is further configured to specify a number M of serial numbers, each associated with one of the number M of geometric features. The system is further configured to calculate, by the processing unit, a geometric center for each of the geometric features of the number N of images. The system is further configured to calculate, based on the number N of images, a number M of average geometric centers associated with the number M of serial numbers. The system is further configured to calculate a shift amount for each geometric feature of the number N of images.

One aspect of the present disclosure provides a method for identifying a cause of manufacturing defects. The method comprises capturing, by an image capture unit, a number N of images from a semiconductor wafer, wherein each of the umber N of images comprises a number M of geometric features, calculating, by a processing unit, a geometric center for each of the geometric features of the number N of images, calculating, based on the number N of images, a number M of average geometric centers associated with the number M of geometric features, and calculating a shift amount for each geometric feature of the number N of images.

Another aspect of the present disclosure provides a non-transitory computer-readable medium. The non-transitory computer-readable medium stores an inspection program including instructions that, when executed by a processing unit, causes an inspection apparatus to capture, by an image capture unit, a number N of images from a semiconductor wafer, wherein each of the number N of images comprises a number M of geometric features, calculate, by the processing unit, a geometric center for each of the geometric features of the number N of images, calculate, based on the number N of images, a number M of average geometric centers associated with the number M of geometric features, perform a first coordinate transformation on a first group of geometric features associated with a specific geometric feature, and perform a second coordinate transformation on a second group of geometric features associated with the specific geometric feature.

The embodiments of the present disclosure disclose a method, a system, and non-transitory computer-readable medium for identifying the cause of manufacturing defects. The disclosed method can identify the location of a specific hole pattern with undesired shift. The disclosed method can provide a precise shift amount of the specific hole pattern. Even more, the disclosed method can also identify the manufacturing process that causes such undesired shift.

The foregoing has outlined rather broadly the features and technical advantages of the present disclosure so that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

FIG. 3D is a cross-section of a semiconductor structure that includes potential defects, in accordance with some embodiments of the present disclosure.

DETAILED DESCRIPTION

Figure 1:
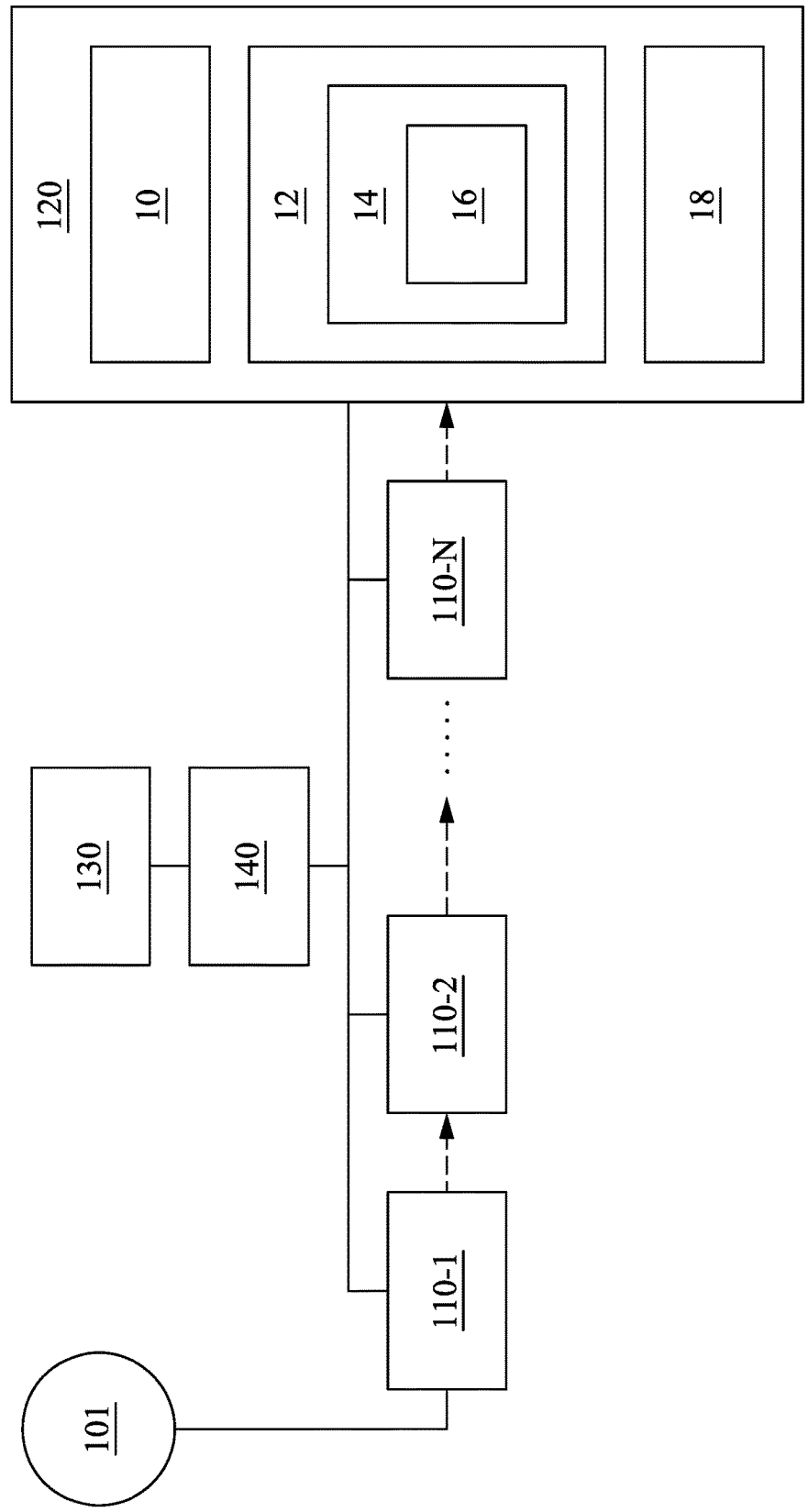
FIG. 1 is a block diagram illustrating a semiconductor fabrication system, in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc., may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only, and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a block diagram illustrating a semiconductor fabrication system 100, in accordance with some embodiments of the present disclosure.

The semiconductor fabrication system 100 includes a plurality of fabrication devices 110-1, 110-2, . . . , and 110-N, as well as an inspection apparatus 120. The fabrication devices 110-1, 110-2, . . . , and 110-N, and the inspection apparatus 120 can be coupled to a controller 130 through a network 140.

A wafer 101 can be provided to the semiconductor fabrication system 100. Manufacturing processes, such as photolithography, deposition, etching, chemical mechanical polishing (CMP), photoresist coating, baking, alignment, or other process, can be conducted on the wafer 101 by one or more of the fabrication devices 110-1, 110-2, . . . , and 110-N. Inspections of the wafer 101 can be conducted by the inspection apparatus 120.

Each of the fabrication devices 110-1, 110-2, . . . , and 110-N can be configured to form structures on the wafer 101. The structures to be formed on the wafer 101 may include, but are not limited to, a pattern, hole, recess, isolation structure, gate structure, conductive via, intermediate structure, or any other semiconductor structures.

The network 140 can be the internet or an intranet implementing network protocols such as transmission control protocol (TCP). Through the network 140, each of the fabrication devices 110-1, 110-2, . . . , and 110-N, and the inspection apparatus 120 may download or upload work in progress (WIP) information regarding the wafer 101 or the fabrication devices from or to the controller 130. Through the network 140, each of the fabrication devices 110-1, 110-2, . . . , and 110-N, and the inspection apparatus 120 can communicate with each other.

The controller 130 can include a processer, such as a central processing unit (CPU), to provide instructions to one or more of the fabrication devices 110-1, 110-2, . . . , and 110-N, and the inspection apparatus 120. Information or data can be exchanged between the fabrication devices 110-1, 110-2, . . . , and 110-N, and the inspection apparatus 120 through the network 140.

The inspection apparatus 120 can include a processing unit 10, a storage unit 12, and an image capture unit 18. The storage unit 12 and the image capture unit 18 can be electrically connected. The storage unit 12 and the image capture unit 18 can be electrically connected with the processing unit 10. Data and/or information can be exchanged between the processing unit 10, the storage unit 12, and the image capture unit 18.

The storage unit 12 may include a non-transitory computer-readable medium 14 that stores an inspection program 16. The inspection program 16 may include instructions that can be executed by the processing unit 10. The instructions of the inspection program 16, when executed by the processing unit 10, may cause the inspection apparatus 120 to perform one or more operations as described in the subsequent paragraphs of the present disclosure.

The image capture unit 18 can be configured to capture images from the wafer 101. The image capture unit 18 can be adaptable to capture images covering different portions of the wafer 101. In some embodiments, the image capture unit 18 can be mechanically movable over the wafer 101 so as to capture images covering different portions of the wafer 101. The image capture unit 18 can be configured to capture dynamic or static images of the wafer 101. In some embodiments, the image capture unit 18 can be a camera or a video recorder. The images captured by the image capture unit 18 can be stored in the storage unit 12.

The images captured by the image unit 18 can be processed and/or analyzed by the processing unit 10. The inspection apparatus 120 can identify one or more defects on the wafer 101. The inspection apparatus 120 can confirm that one or more defects on the wafer 101 originate from one or more of the fabrication devices 110-1, 110-2, . . . , and 110-N.

Although FIG. 1 does not show any other fabrication devices following the inspection apparatus 120, as an exemplary embodiment, it is not intended to be limiting. In other exemplary embodiments, various kinds of fabrication devices can be scheduled following the inspection apparatus 120, and used to perform various processes according to the design requirement.

FIGS. 2A, 2B, 2C, 2D, 2E, 2F, 2G, 2H, and 2I are exemplary schematic views of various operations for manufacturing container holes, in accordance with some embodiments of the present disclosure.

Multi-patterning techniques can be broadly divided into pattern-split and self-aligned types. A typical example of the former is the litho-etch-litho-etch (LELE) technique. As the name implies, LELE aims to achieve narrow pitches by repeating the conventional lithography and etching process. The pattern-split type has the ability to split the pattern as desired even in the case of random patterns like metal lines. Nevertheless, since it involves several cycles of the exposure process, this raises concerns about drops in overlay accuracy.

In contrast, the self-aligned type, which is usually referred to as self-aligned double patterning (SADP) or self-aligned multiple patterning (SAMP), has the great advantage of being able to narrow the pitch with only one exposure process, thereby eliminating overlay accuracy as a matter of concern. SADP is a robust technique for doubling the pitch of line patterns, but can also be applied to form hole patterns. A simplified flow for forming container holes on a semiconductor wafer is illustrated in accordance with FIGS. 2A, 2B, 20 2C, 2D, 2E, 2F, 2G, 2H, and 2I. Each of FIGS. 2A, 2B, 2C, 2D, 2E, 2F, 2G, 2H, and 2I pertains to a top view of a portion of a semiconductor wafer.

Figure 2A:
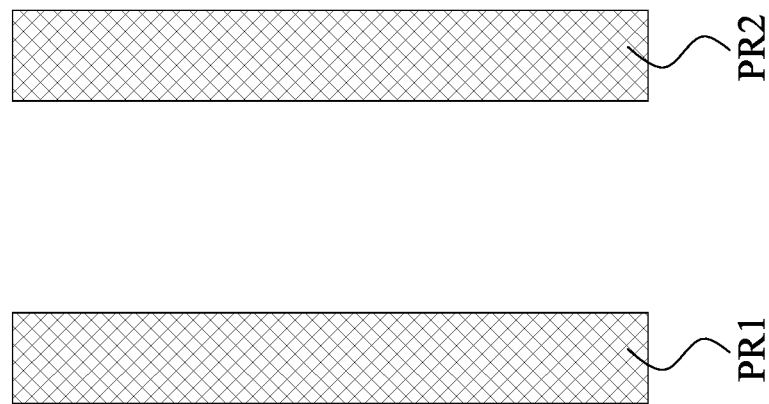
FIGS. 2A, 2B, 2C, 2D, 2E, 2F, 2G, 2H, and 2I are exemplary schematic views of various operations for manufacturing container holes, in accordance with some embodiments of the present disclosure.

Referring to FIG. 2A, photoresists PR1 and PR2 can be formed above a semiconductor substrate. The photoresists PR1 and PR2 can 25 be parallel to each other. The photoresists PR1 and PR2 can collectively be referred to as a mandrel.

Figure 2B:
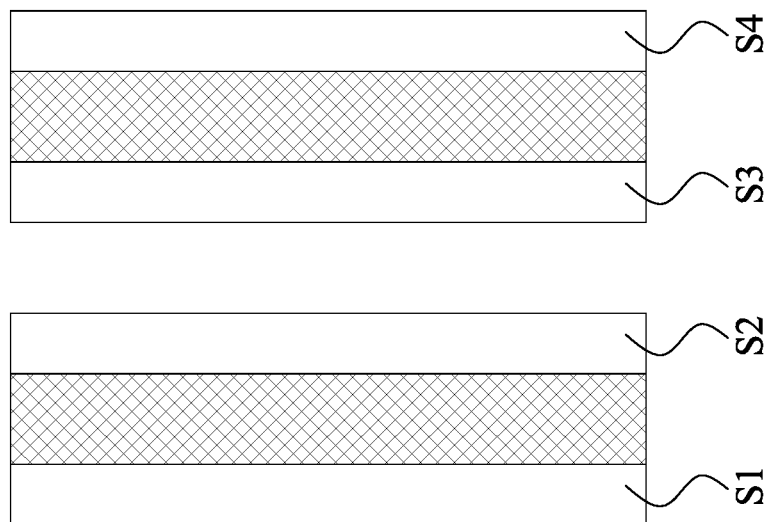

Referring to FIG. 2B, spacers S1 and S2 can be formed adjacent to photoresist PR1, and spacers S3 and S4 can be formed adjacent to photoresist PR2. The spacers S1 and S2 can be formed on opposite sides of the photoresist PR1. The spacers S3 and S4 can be formed on opposite sides of the photoresist PR2. In some embodiments, formation of the spacers S1, S2, S3, and S4 involve a suitable film forming method, such as chemical vapor deposition (CVD), atomic layer deposition (ALD) or physical vapor deposition (PVD). Formation of the spacers S1, S2, S3, and S4 can also involve etching such as dry or wet etching.

Figure 2C:

Referring to FIG. 2C, the photoresists PR1 and PR2 are removed and the spacers S1, S2, S3, and S4 retained. Removal of the photoresists PR1 and PR2 may involve etching such as dry or wet etching.

Figure 2D:
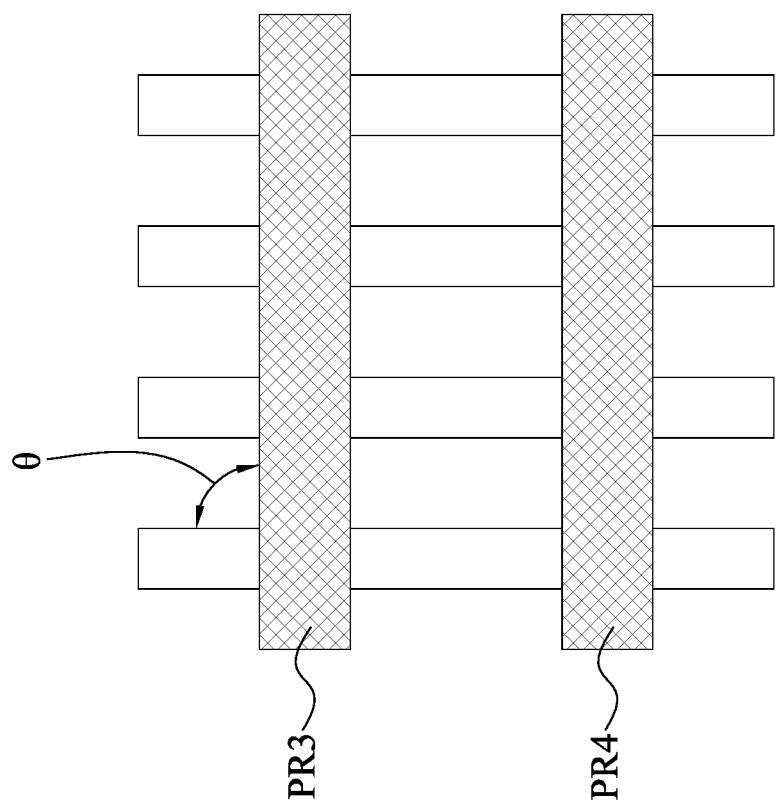

Referring to FIG. 2D, photoresists PR3 and PR4 can be formed above the spacers S1, S2, S3, and S4. The photoresists PR3 and PR4 can be parallel. The photoresists PR3 and PR4 can be located at a horizontal level different from that of the spacers S1, S2, S3, and S4. In some embodiments, intermediate layers can be formed between the photoresists PR3 and PR4 and the spacers S1, S2, S3, and S4. An angle $\theta$ can exist between the photoresist PR3 and the spacers S1, S2, S3, and S4. An angle $\theta$ can exist between the photoresist PR4 and the spacers S1, S2, S3, and S4.

Although in this exemplary embodiment, $\theta$ is around 90°, it can be contemplated that $\theta$ can be adjusted to fulfill actual design needs, and thus can be from 1° to 180°.

Figure 2E:
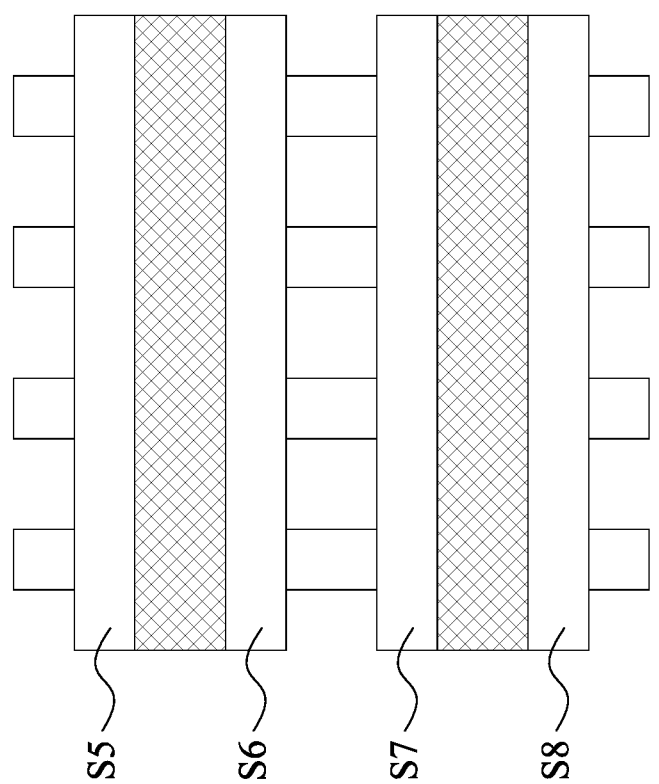

Referring to FIG. 2E, spacers S5 and S6 can be formed adjacent to photoresist PR3, and spacers S7 and S8 can be formed adjacent to photoresist PR4. The spacers S5 and S6 can be formed on opposite sides of the photoresist PR3. The spacers S7 and S8 can be formed on opposite sides of the photoresist PR4. In some embodiments, formation of the spacers S5, S6, S7, and S8 involves a suitable film forming method, such as CVD, ALD or PVD. Formation of the spacers S5, S6, S7, and S8 can also involve etching such as dry or wet etching.

Figure 2F:
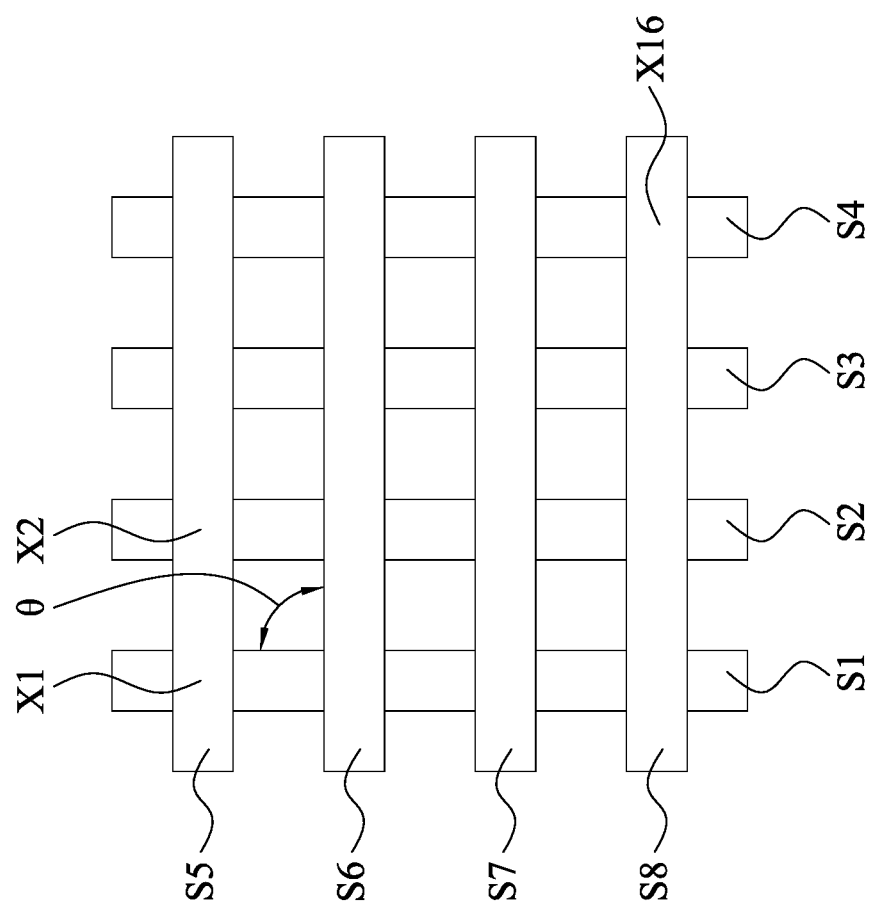

Referring to FIG. 2F, the photoresists PR3 and PR4 are removed and the spacers S5, S6, S7, and S8 are retained. The removing of the photoresists PR3 and PR4 may involve etching such as dry or wet etching. After the photoresists PR3 and PR4 are removed, a grid structure can then be formed, as shown in FIG. 2F. The grid structure includes several intersecting regions. For example, the spacer S1 can intersect with the spacer S5 at intersecting region X1, and the spacer S2 with the spacer S5 at intersecting region X2. Furthermore, the 15 spacer S4 intersects with the spacer S8 at the intersecting region X16.

Figure 2G:
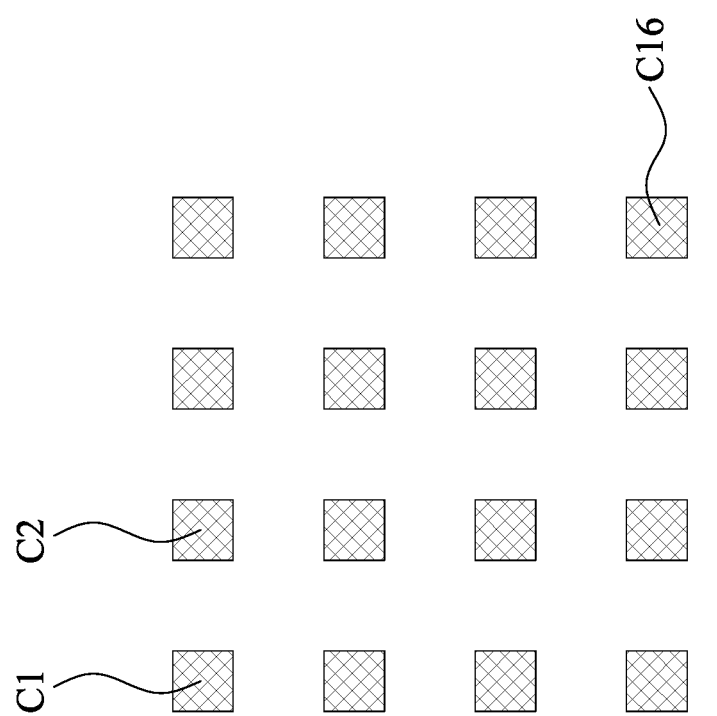

Referring to FIG. 2G, a plurality of photoresists C1, C2, . . . , C16 can be formed at locations corresponding to those of the intersecting regions X1, X2, . . . , X16.

Figure 2H:
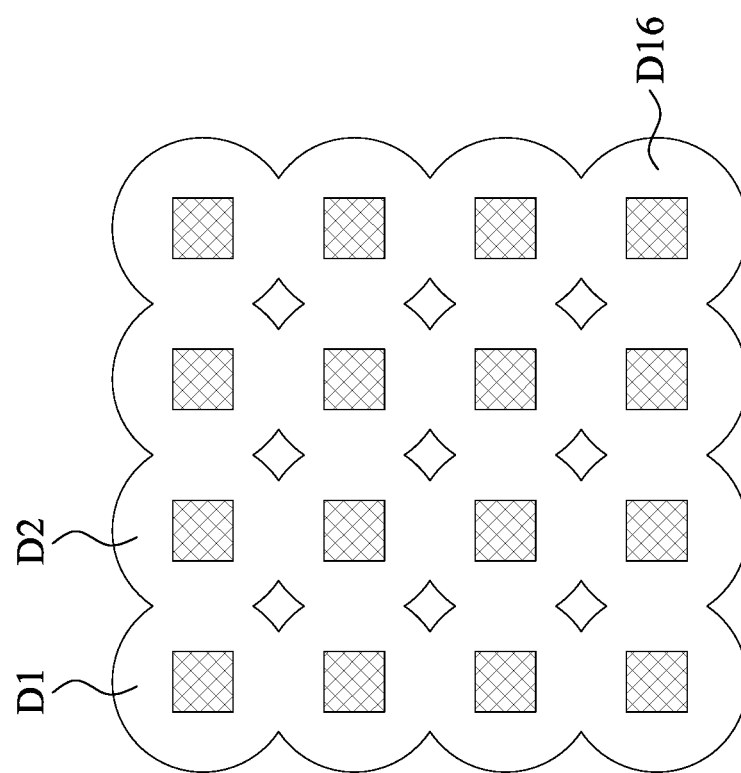

Referring to FIG. 2H, spacers D1, D2, . . . , D16 can be formed around each of the photoresists C1, C2, . . . , C16. The spacers D1, D2, . . . , D16 can respectively surround the photoresists C1, C2, . . . , C16. In some embodiments, D1, D2, . . . , D16 involve a suitable film forming method, such as CVD, ALD or PVD.

Figure 2I:
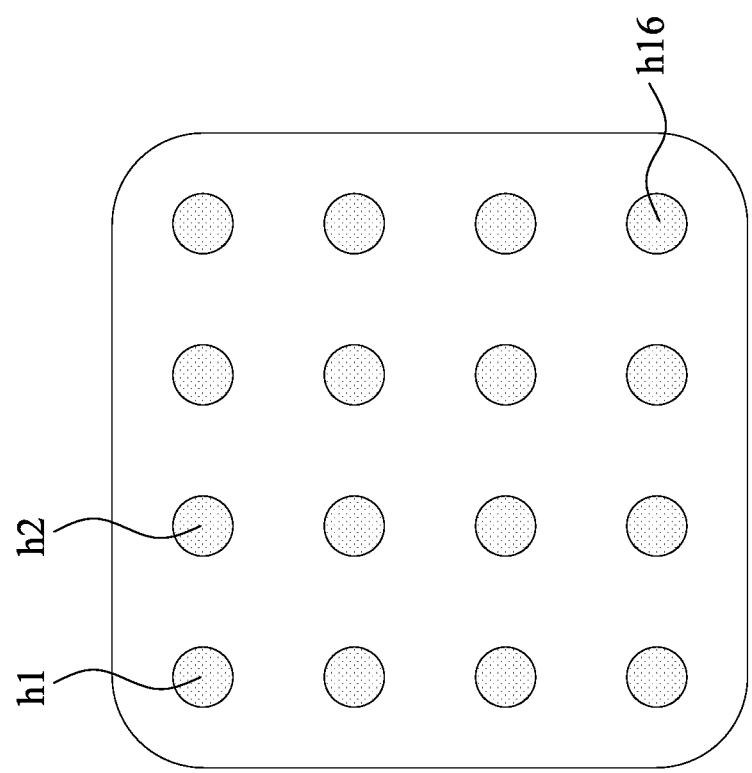

Referring to FIG. 2I, the photoresists C1, C2, . . . , C16 can be removed with the spacers D1, D2, . . . , D16 retained. Cavities can then be formed within each of the spacers D1, D2, . . . , D16. With appropriate etching processes, the profiles of the photoresists C1, C2, . . . , C16 can be transformed into hole structures h1, h2, . . . , and h16 on the semiconductor substrate. The hole structures h1, h2, . . . , and h16 can each have a circular profile from the top view. Conductive materials can be filled within each of the hole structures h1, h2, . . . , and h16 to form connective structures. The hole structures h1, h2, . . . , and h16 can each be referred to as a container hole.

The operations shown in FIGS. 2A, 2B, and 2C can be referred to as a first manufacturing process in the present disclosure, and operations shown in FIGS. 2D, 2E, and 2F can be referred to as a second manufacturing process in the present disclosure. In some embodiments, the operations shown in FIGS. 2A, 2B, and 2C can also be referred to as process "SA," and the operations shown in FIGS. 2D, 2E, and 2F can also be referred to as process "SB."

Figure 3A:
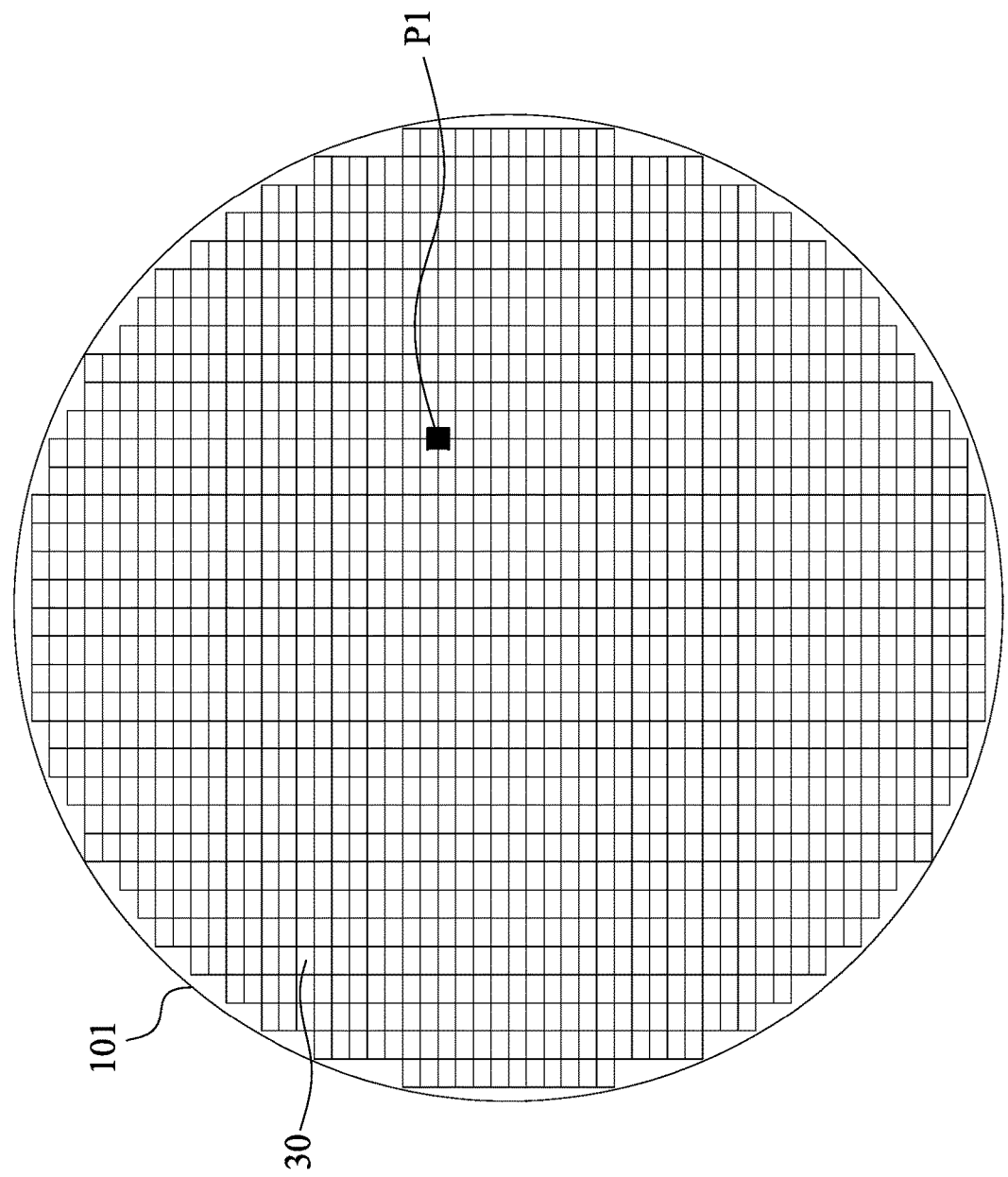
FIG. 3A is a top view of a wafer, in accordance with some embodiments of the present disclosure.

FIG. 3A is a top view of a wafer, in accordance with some embodiments of the present disclosure.

FIG. 3A is a top view of a wafer 101, which may include a plurality of dies 30. Each of the dies 30 may include semiconductor devices, which can include active components and/or passive components. The active component may include a memory die (e.g., dynamic random access memory (DRAM) die, a static random access memory (SRAM) die, etc.)), a power management die (e.g., power management integrated circuit (PMIC) die)), a logic die (e.g., system-on-a-chip (SoC), or other active components. The passive component may include a capacitor, a resistor, an inductor, a fuse or other passive components.

During manufacture, inspections can be conducted on the wafer 101 to check whether the semiconductor structures on each of the dies are formed as expected. In some embodiments, the wafer 101 can be inspected by, for example, the inspection apparatus 120 as shown in FIG. 1. Images of portions of the wafer 101 can be captured and analyzed. In some embodiments, a plurality of images P1 can be captured by, for example, the image capture unit 18 and then stored into the storage unit 12. Each of the plurality of images P1 can cover a portion of the wafer 101. Different images can cover different portions of the wafer 101.

Figure 3B:
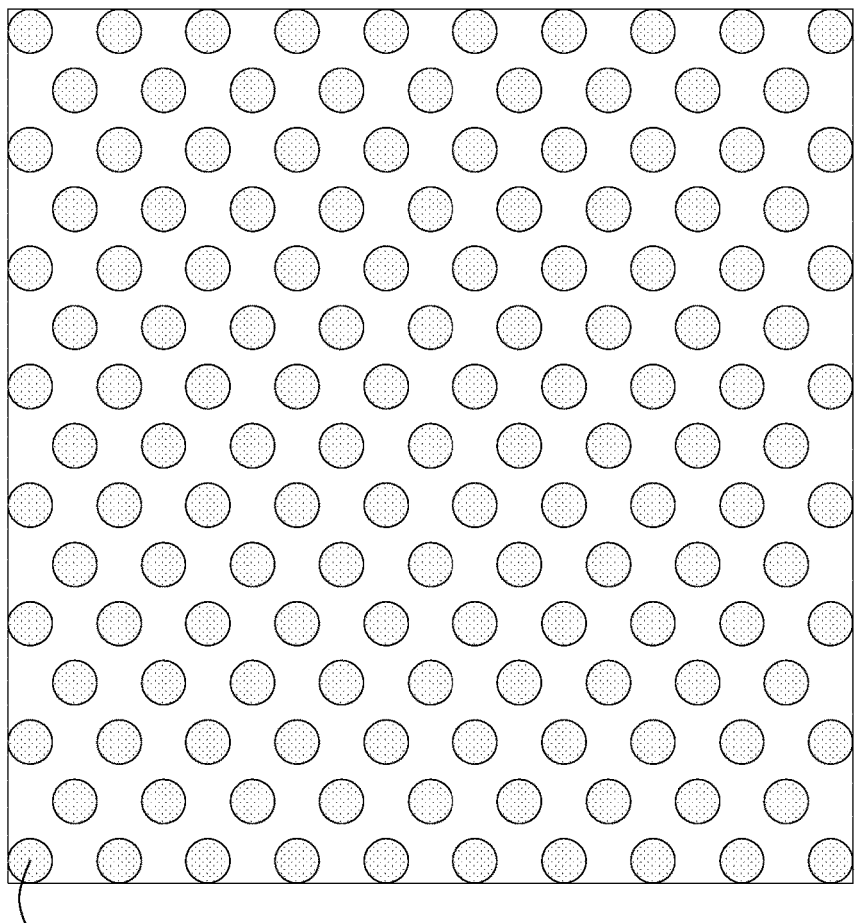
FIG. 3B is an enlargement of a region as shown in FIG. 3A, in accordance with some embodiments of the present disclosure.

FIG. 3B is an enlargement of a region P1 shown in FIG. 3A, in accordance with some embodiments of the present disclosure. Image P1 includes a plurality of geometric features h1. The plurality of geometric features h1 may include an identical profile. In some embodiments, the plurality of geometric features h1 may each include a circular profile. In other embodiments, the plurality of geometric features h1 may each include a rectangular profile or an elliptical profile. In yet other embodiments, the plurality of geometric features h1 may include different profiles.

The plurality of geometric features h1 can be formed by, for example, the operations described in accordance with FIGS. 2A-2I. In general, the geometric features h1 are expected to be regularly arranged, along both horizontal and vertical orientations. Nevertheless, due to variances introduced by various manufacturing processes, a shift to the location of the geometric feature h1 can occur.

Figure 3C:
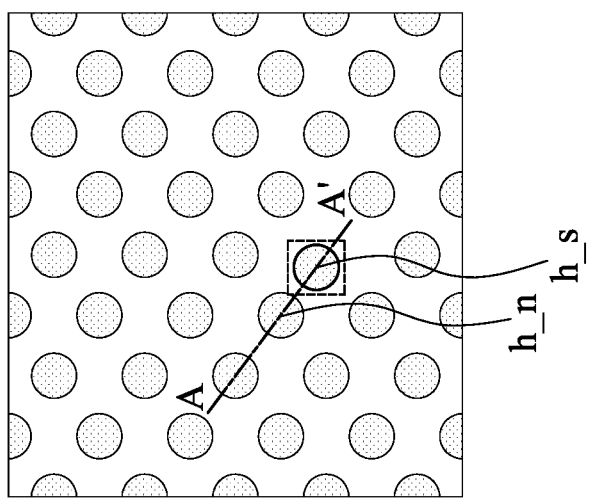
FIG. 3C is an enlargement of a region that includes potential defects on a semiconductor wafer, in accordance with some embodiments of the present disclosure.

FIG. 3C is an enlargement of a region that includes potential defects on the semiconductor wafer, in accordance with some embodiments of the present disclosure.

Referring to FIG. 3C, the reference symbol h_s indicates a specific geometric feature that is irregularly located. The geometric feature h_s is relatively shifted to the left, and is closer to its neighboring geometric feature h_n. The shift of the geometric feature h_s may adversely affect the yield rate of the manufactured semiconductor product. The shift of a geometric feature can be referred to as "hole shift" or "feature shift" in the present disclosure.

Details are further illustrated in accordance with FIG. 3D.

FIG. 3D is a cross-section of a semiconductor structure that includes potential defects, in accordance with some embodiments of the present disclosure.

FIG. 3D is a cross-section of a semiconductor structure 40 along the dashed-line A-A' of FIG. 3C. The semiconductor structure 40 includes isolation layers 41, 44, and 46. The semiconductor structure 40 further includes polysilicon layers 43 and 45. The semiconductor structure 40 further includes a dielectric layer 42 disposed on the isolation layer 41. Conductive contacts 47 can be embedded within the isolation layer 41. The conductive contacts 47 can be referred to as landing pads in the present disclosure.

In some embodiments, the isolation layers 41, 44, and 46 can include, for example, a shallow trench isolation (STI), a field oxide (FOX), a local-oxidation of silicon (LOCOS) feature, and/or other suitable isolation elements. The isolation layers 41, 44, and 46 can include a dielectric material such as silicon oxide, silicon nitride, silicon oxy-nitride, fluoride-doped silicate (FSG), a low-k dielectric material, combinations thereof, and/or other suitable materials.

In some embodiments, the dielectric layer 42 can include dielectric material(s), such as high-k dielectric material. The high-k dielectric material may have a dielectric constant (k value) greater than 4. The high-k material may include hafnium oxide ($HfO_2$), zirconium oxide ($ZrO_2$), lanthanum oxide ($La_2O_3$), yttrium oxide ($Y_2O_3$), aluminum oxide ($Al_2O_3$), titanium oxide ($TiO_2$) or another applicable material.

In some embodiments, the polysilicon layers 43 and 45 can include silicon oxide ($SiO_x$), silicon nitride ($Si_xN_y$), silicon oxynitride (SiON), or a combination thereof. Other suitable materials are within the contemplated scope of this disclosure.

Referring to FIG. 3D, the geometric features h_s and h_n may each constitute a container in which conductive materials can be filled. The conductive materials filled within the geometric features h_s and h_n can respectively contact the conductive contacts 47. The conductive contacts 47 will be electrically connected to the memory devices (not shown) under the semiconductor structure 40. The conductive materials filled within the geometric features h_s and h_n may each constitute a conductive wire for connecting electrical components to the memory devices (not shown) under the semiconductor structure 40.

If hole shift happens during manufacture, for example, as shown in FIG. 3D, the geometric feature h s can be very close to its neighboring geometric feature h_n, and thus after the conductive materials are filled within the geometric features h_s and h_n, a short circuit can be formed. The short circuit formed resulting from a hole shift may adversely affect function of the manufactured semiconductor device.

Figure 4A:
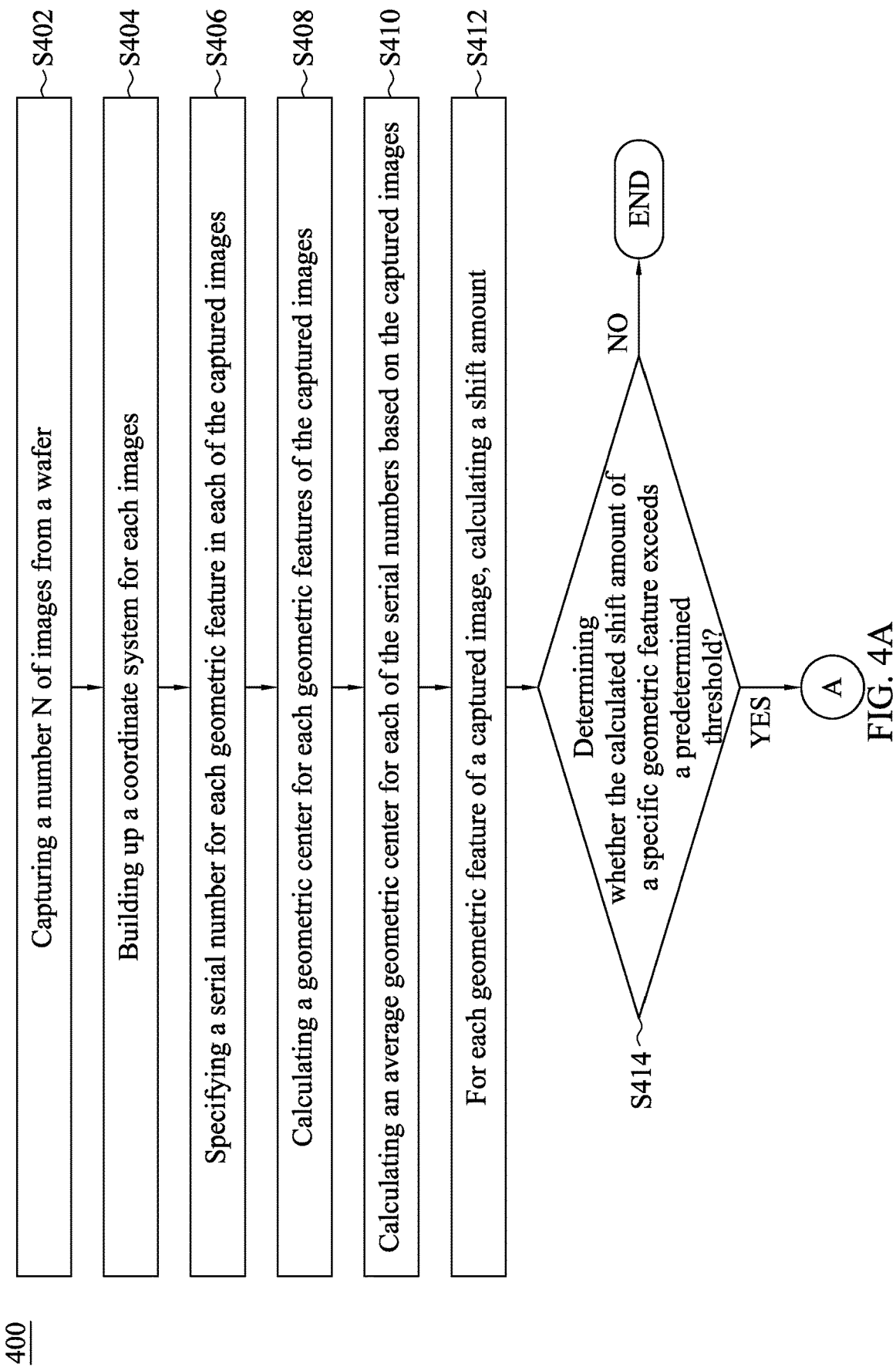
FIGS. 4A and 4B are schematic charts illustrating a method for identifying a cause of manufacturing defects, in accordance with some embodiments of the present disclosure.
Figure 4B:
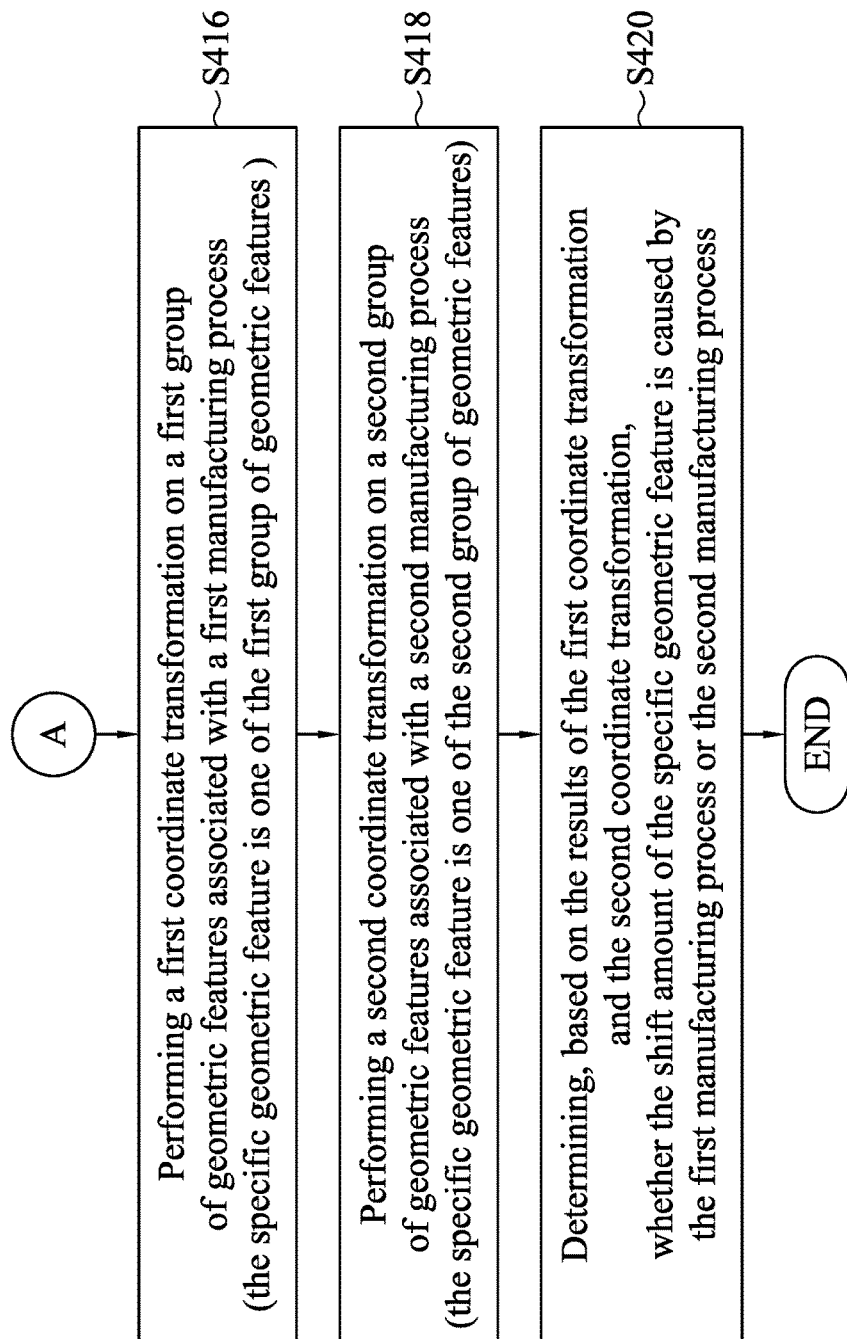

FIGS. 4A and 4B is a schematic chart illustrating a method for identifying a cause of manufacturing defects, in accordance with some embodiments of the present disclosure.

FIGS. 4A and 4B show a method 400 for identifying a cause of manufacturing defects, in accordance with some embodiments of the present disclosure. The method 400 includes operations S402, S404, S406, S408, S410, S412, S414, S416, S418, and S420. The method 400 can be performed, for example, by the inspection apparatus 120 as shown in FIG. 1.

In the operation S402, a plurality of images of a wafer are captured. In some embodiments, a number N of images covering different portions of a wafer can be captured by, for example, the image capture unit 18 of the inspection apparatus 120. The number N of images can each include a plurality of geometric features as shown in FIG. 3B. In some embodiments, the number N of images can each include a number of M geometric features. The numbers N and M are positive integers. In some embodiments, each of the number of M geometric features can have a circular or round profile.

In the operation S404, a coordinate system is built up for each of the images captured during the operation S402. In some embodiments, the coordinate system is a two-dimensional system that includes an x-axis and y-axis. In some embodiments, an origin of coordinate (i.e., (0, 0)) is specified at the center of each of the number N of images. In some embodiments, the coordinate system can include four quadrants.

In the operation S406, for each of the captured images, each of the number of M geometric features is specified by a serial number. In some embodiments, the number of M geometric features in an image can be specified by serial numbers from 1, 2, 3, . . . , M. In some embodiments, for each of the number N of images, the geometric feature on the top left corner of an image can be assigned a serial number "1." In some embodiments, for each of the number N of images, the geometric features on the same column will be assigned sequential serial numbers. All the geometric features with an identical serial number in the number N of images will have similar x and y coordinate values.

In the operation S408, a geometric center for each of the geometric features in the number N of images is calculated. In some embodiments, the calculations can be performed by, for example, the processing unit 10 of the inspection apparatus 120. In a single image, a number M of geometric centers can be obtained.

In the operation S410, an average geometric center associated with each of the serial numbers can be calculated. In some embodiments, a number M of average geometric centers associated with the number M of geometric features can be calculated. The average geometric center associated with the serial number "1" can be calculated based on all the geometric centers with the serial number "1" in the captured images. Similarly, the average geometric center associated with the serial number "2" can be calculated based on all the geometric centers with the serial number "2" in the captured images, and so forth.

In some embodiments, the calculations can be performed by, for example, the processing unit 10 of the inspection apparatus 120. In some embodiments, a number M of average geometric centers will be obtained. The number M of average geometric centers can be calculated based on the number N of images.

In the operation S412, a shift amount can be calculated for each of the geometric features. In some embodiments, the shift amount of a geometric feature can be calculated based on the geometric center of the geometric feature and its associated average geometric center. In some embodiments, the shift amount of a geometric feature with the serial number "1" can be calculated based on its geometric center and the average geometric center associated with the serial number "1." Similarly, the shift amount of a geometric feature with the serial number "2" can be calculated based on its geometric center and the average geometric center associated with the serial number "2," and so forth.

In the operation S414, it is determined whether any shift amount obtained at the operation S412 exceeds a predetermined is threshold (e.g., a first threshold) The determination can be made by, for example, the processing unit 10 of the inspection apparatus 120.

A shift amount of a specific geometric feature exceeding a predetermined threshold implies that the manufacturing process of the specific geometric involves defects. If any shift amount of the geometric features within the captured images does exceed a predetermined threshold, the method 400 continues with the operation S416 shown in FIG. 4B. Otherwise, the method 400 concludes.

Referring to FIG. 4B, in the operation S416, a first coordinate transformation is performed on a first group of geometric features associated with a first manufacturing process. The specific geometric feature having a shift amount exceeding the predetermined threshold (e.g., a first threshold), as well as the first group of geometric features, is formed by the first manufacturing process. In the operation S416, the specific geometric feature is one of the first group of geometric features.

In the operation S418, a second coordinate transformation is performed on a second group of geometric features associated with a second manufacturing process. The specific geometric feature having a shift amount exceeding the predetermined threshold (e.g., a first threshold), as well as the second group of geometric features, is formed by the second manufacturing process. In the operation S418, the specific geometric feature is one of the second group of geometric features.

Referring to the operations S416 and S418, if a shift amount of a specific geometric feature exceeds a predetermined threshold, the first coordinate transformation and the second coordinate transformation will both conducted on the specific geometric feature.

In the operation S420, based on the results of the first coordinate transformation and the second coordinate transformation, it can be determined whether the shift amount of the specific geometric feature is caused by the first manufacturing process or the second manufacturing process.

In some embodiments, the operation S420 includes comparing a y-coordinate value of the specific geometric feature obtained after the first coordinate transformation with a predetermined threshold (i.e., a second threshold). In some embodiments, the operation S420 includes comparing a y-coordinate value of the specific geometric feature obtained after the second coordinate transformation with the predetermined threshold (i.e., a second threshold).

The determination can be made by, for example, the processing unit 10 of the inspection apparatus 120. In some embodiments, the abnormal shift may be caused solely by the first manufacturing process. In some embodiments, the abnormal shift may be caused solely by the second manufacturing process. In some embodiments, the abnormal shift may be caused by both the first and second manufacturing processes.

Figure 5A:
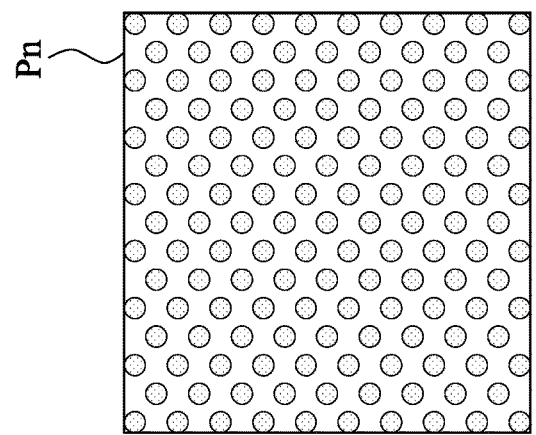
FIG. 5A is an exemplary schematic view of one of various operations for identifying a cause of manufacturing defects, in accordance with some embodiments of the present disclosure.
Figure 5A:
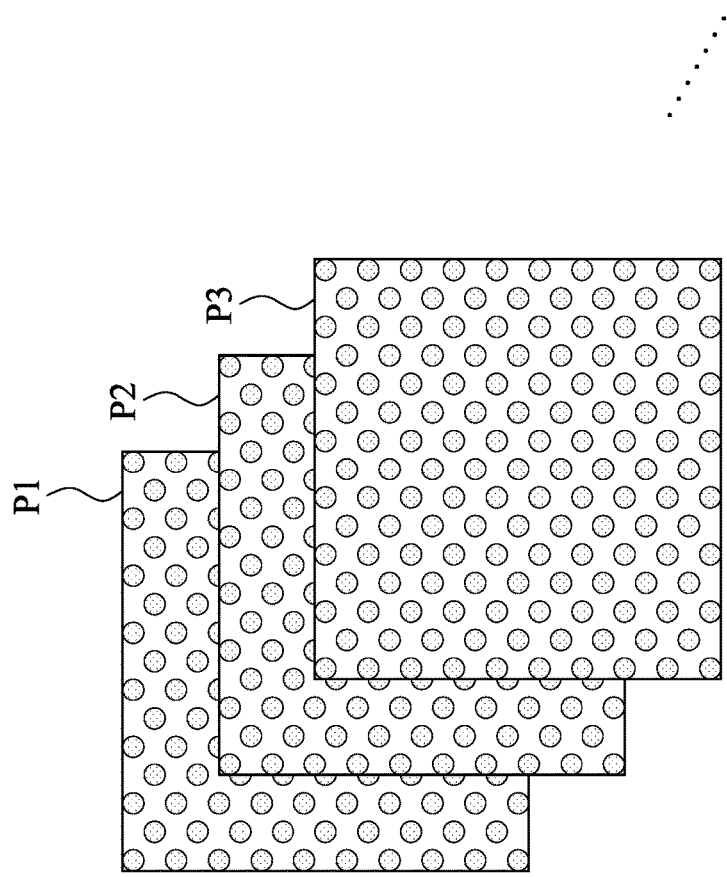

FIG. 5A is an exemplary schematic view of one of various operations for identifying a cause of manufacturing defects, in accordance with some embodiments of the present disclosure.

FIG. 5A shows a plurality of images P1, P2, P3, . . . , and Pn that can be captured during the operation S402. Referring to FIG. 5A, the images captured can each include a plurality of geometric features. In this exemplary embodiment, the images captured can each include a number M of geometric features. In this exemplary embodiment, the geometric features each include a circular or round profile.

Figure 5B:
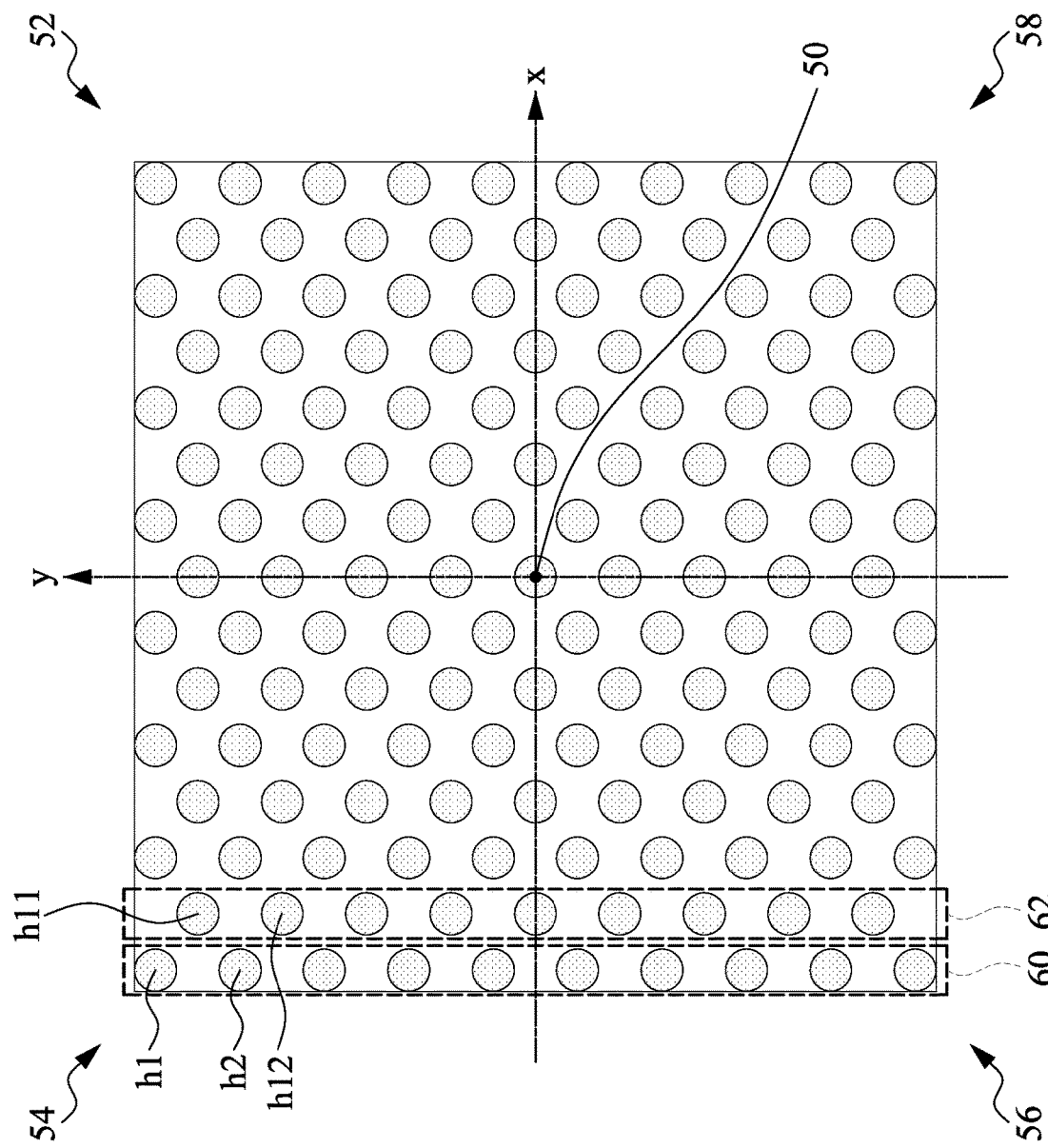
FIG. 5B is an exemplary schematic view of one of various operations for identifying a cause of manufacturing defects, in accordance with some embodiments of the present disclosure.

FIG. 5B is an exemplary schematic view of one of various operations for identifying a cause of manufacturing defects, in accordance with some embodiments of the present disclosure. The operations S404 and S406 of FIG. 4A can be better understood in view of the exemplary schematic view of FIG. 5B.

Referring to FIG. 5B, a coordinate system is built up for each of the images captured during the operation S402. The coordinate system includes an origin of coordinate 50 and four quadrants 52, 54, 56, and 58. In addition, for each of the captured images, each of the number of M geometric features are specified by a serial number. In this an exemplary embodiments, the top left geometric feature h1 can be assigned a serial number "1," and the geometric feature h2 can be assigned a serial number "2," and so forth. The geometric features belonging to the same column (e.g., the column 60) will be assigned sequential serial numbers. In this exemplary embodiment, the first two geometric features h11 and h12 belonging to the column 62 can be assigned serial numbers "11" and "12," respectively.

Figure 5C:
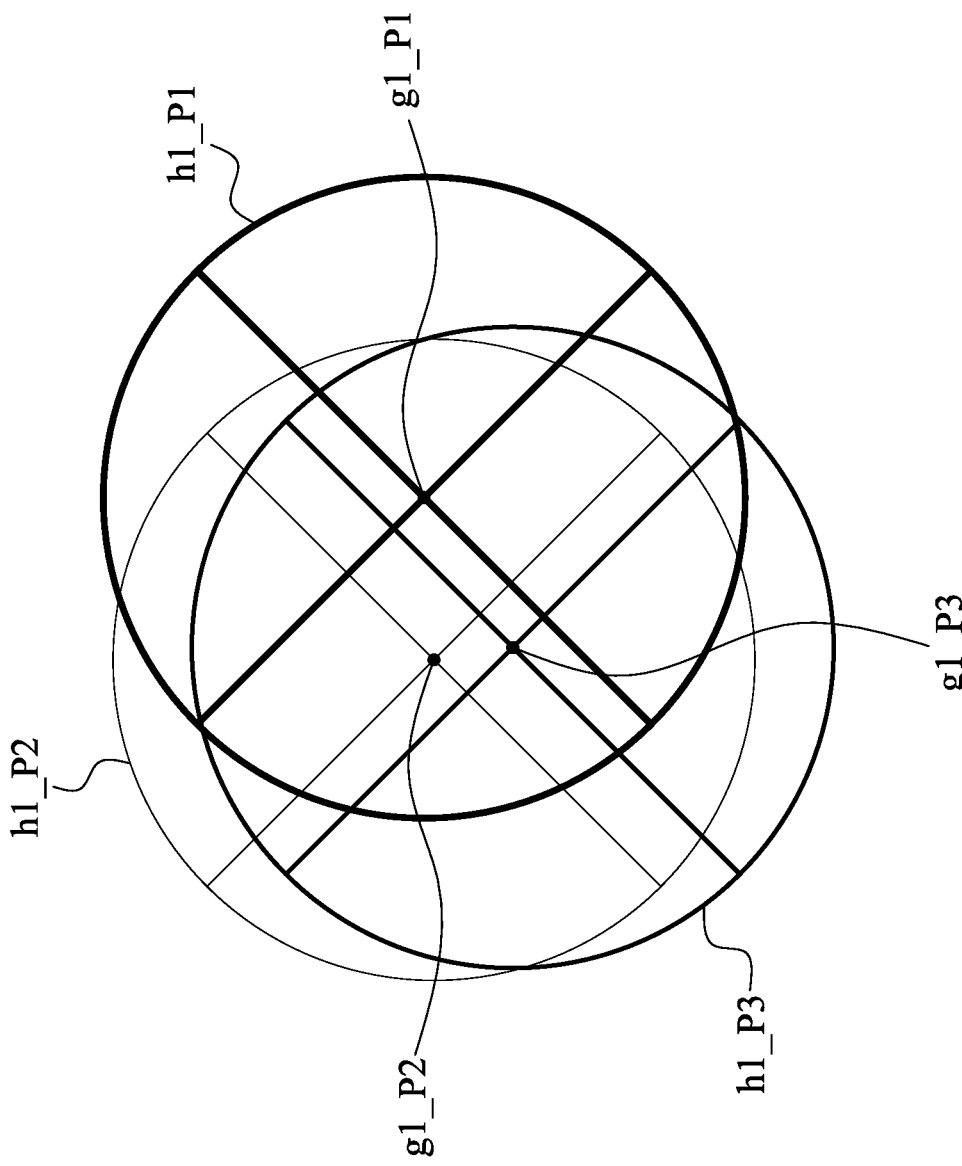
FIG. 5C is an exemplary schematic view of one of various operations for identifying a cause of manufacturing defects, in accordance with some embodiments of the present disclosure.

FIG. 5C is an exemplary schematic view of one of various operations for identifying a cause of manufacturing defects, in accordance with some embodiments of the present disclosure. The operations S408 and S410 of FIG. 4A can be better understood in view of the exemplary schematic view of FIG. 5C.

FIG. 5C shows geometric features h1_P1, h1_P2, and h1_P3. In this exemplary embodiment, the geometric features h1_P1, h1_P2, and h1_P3 can correspond to the geometric features of different images P1, P2, and P3 that have an identical serial number "1." The geometric feature h1_P1 includes a geometric center g1_P1. The geometric feature h1_P2 includes a geometric center g1_P2. The geometric feature h1_P3 includes a geometric center g1_P3. The geometric centers g1_P1, g1_P2, and g1_P3 can be calculated by, for example, the processing unit 10 of the inspection apparatus 120.

After the geometric centers g1_P1, g1_P2, and g1_P3 are obtained, an average geometric center associated with the serial number "1" can be obtained. The average geometric center can be calculated by, for example, the processing unit 10 of the inspection apparatus 120. The geometric centers g1_P1, g1_P2, and g1_P3, and the average geometric center each include an x coordinate value and a y coordinate value.

FIG. 5C shows a simplified embodiment in which merely three images P1, P2, and P3 are utilized in the calculations of the average geometric centers. It can be contemplated that, in some embodiments, all the images captured (e.g., a number of M) can be utilized in the calculations of the average geometric centers.

Figure 5D:
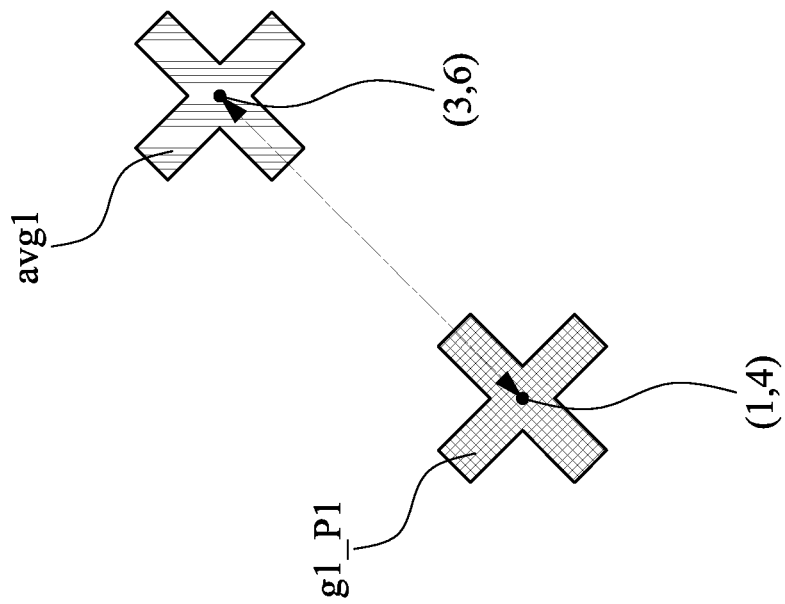
FIG. 5D is an exemplary schematic view of one of various operations for identifying a cause of manufacturing defects, in accordance with some embodiments of the present disclosure.

FIG. 5D is an exemplary schematic view of one of various operations for identifying a cause of manufacturing defects, in accordance with some embodiments of the present disclosure. The operation S412 of FIG. 4A can be better understood in view of the exemplary schematic view of FIG. 5D.

FIG. 5D shows a geometric center g1_P1 and an average geometric center avg1. The geometric center g1_P1 can be the geometric center of the geometric feature having a serial number "1" of the image P1. The average geometric center avg1 can be obtained by averaging all the geometric centers for the geometric features having a serial number "1." In this exemplary embodiment, the geometric center g1_P1 includes coordinate values (1, 4), and the average geometric center avg1 includes coordinate values (3, 6).

A shift amount of the specific geometric feature (i.e., the geometric feature having a serial number "1" of the image P1) is calculated based on the average geometric center (i.e., avg1) associated with the specific geometric feature and the geometric center of the specific geometric feature (i.e., g1_P1). In this exemplary embodiment, a shift amount for the geometric feature having a serial number "1" of the image P1 can be obtained by calculating the distance between coordinates (1, 4) and (3, 6).

Figure 5E:
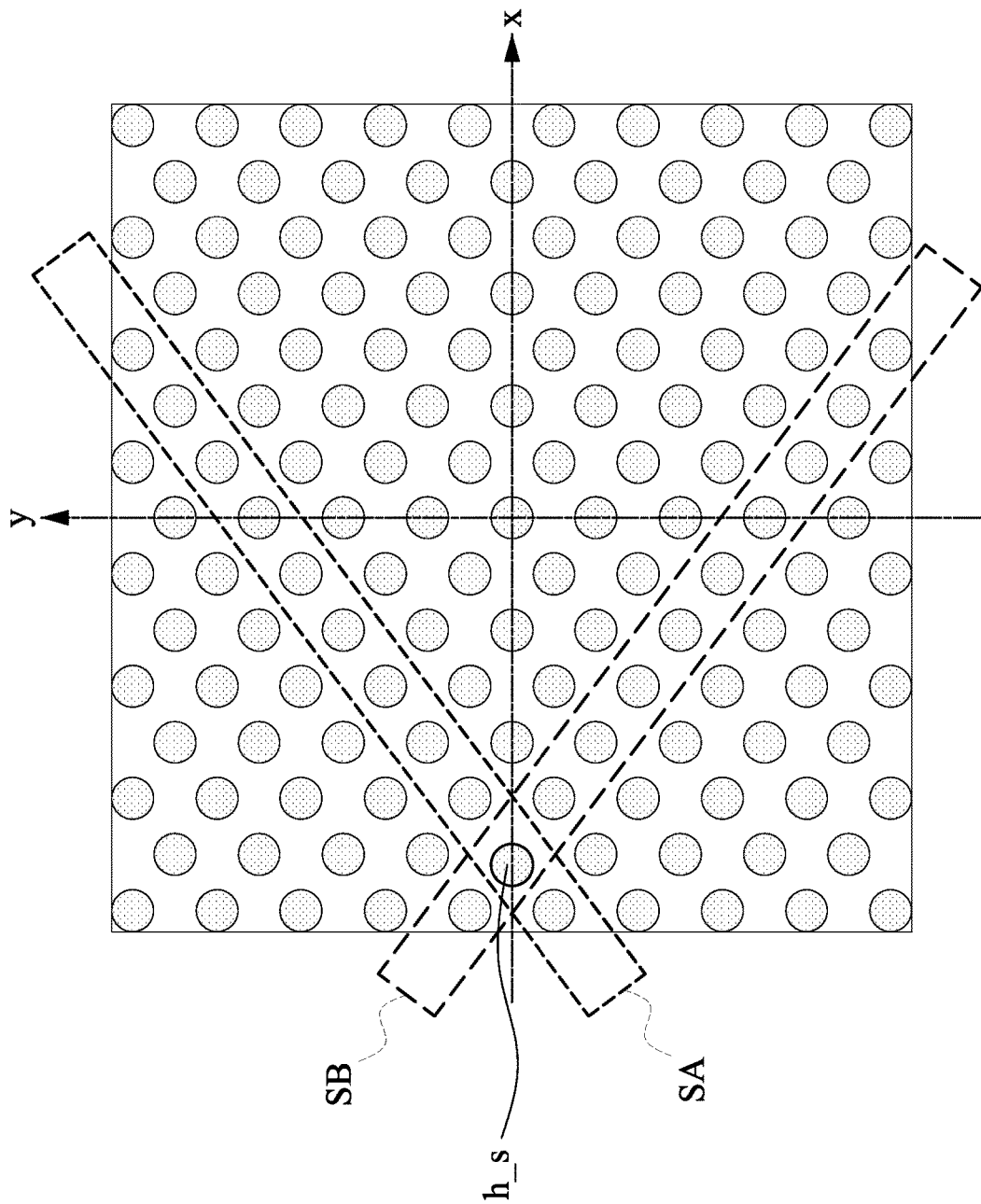
FIG. 5E is an exemplary schematic view of one of various operations for identifying a cause of manufacturing defects, in accordance with some embodiments of the present disclosure.

FIG. 5E is an exemplary schematic view of one of various operations for identifying a cause of manufacturing defects, in accordance with some embodiments of the present disclosure. The operations S416 and S418 of FIG. 4B can be better understood in view of the exemplary schematic view of FIG. 5E.

In FIG. 5E, for example, the geometric feature h_s has been identified as having a shift exceeding a predetermined threshold in the operation S414. The geometric feature h_s was formed by manufacturing processes "SA" and "SB." Then, a first group of geometric features associated with the manufacturing process "SA" are selected, and a second group of geometric features associated with the manufacturing process "SB" are selected. A first type of coordinate transformations will be conducted on the first group of geometric features, and a second type of coordinate transformations will be conducted on the second group of geometric features.

Figure 5F:
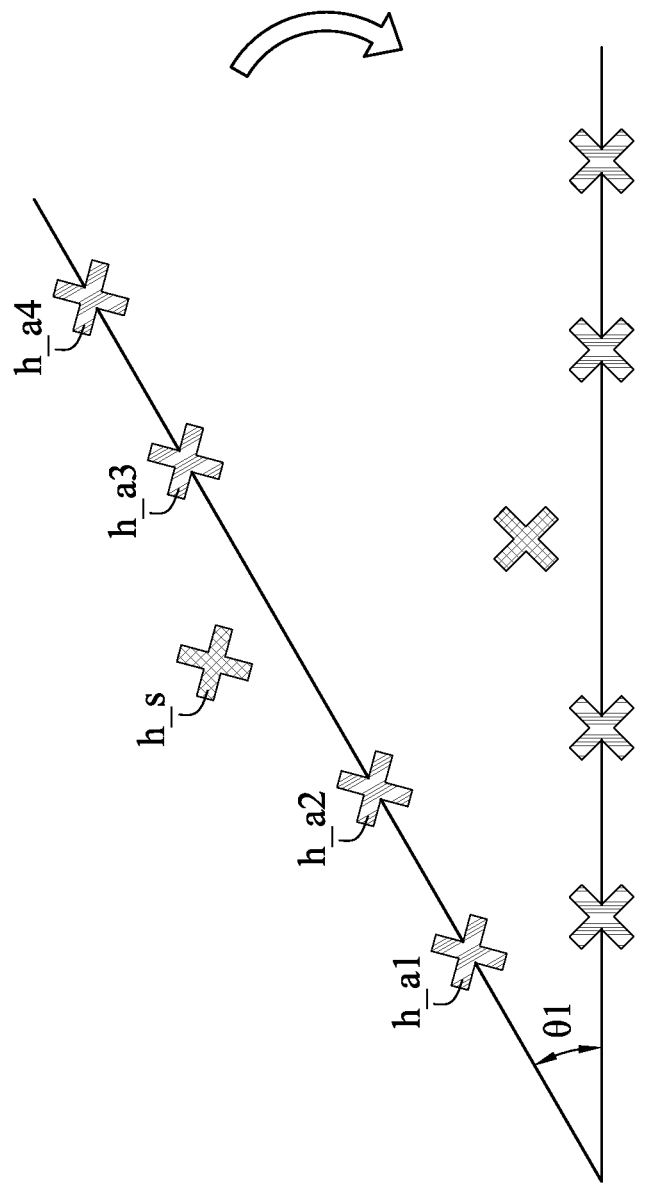
FIG. 5F is an exemplary schematic view of one of various operations for identifying a cause of manufacturing defects, in accordance with some embodiments of the present disclosure.

FIG. 5F is an exemplary schematic view of one of various operations for identifying a cause of manufacturing defects, in accordance with some embodiments of the present disclosure. The operation S416 of FIG. 4B can be better understood in view of the exemplary schematic view of FIG. 5F.

FIG. 5F shows the geometric center of the geometric feature h_s, and several geometric centers of the geometric features h_a1, h_a2, h_a3, and h_a4. The geometric features h_s, h_a1, h_a2, h_a3, and h_a4 are associated with the manufacturing processes "SA." A coordinate transformation is performed on the geometric centers of the geometric features h_s, h_a1, h_a2, h_a3, and h_a4. The coordinate transformation can be performed according to the following equations.

$$x_T = x \times \cos\theta_1 - y \times \sin\theta_1 \quad \text{(Equation 1)}$$

$$y_T = y \times \cos\theta_1 + x \times \sin\theta_1 \quad \text{(Equation 2)}$$

In Equations 1 and 2, x represents a coordinate value on an x-axis, y represents a coordinate value on a y-axis, $x_T$ represents a transformed coordinate value on the x-axis, $y_T$ represents a transformed coordinate value on the y-axis, and θ1 represents an angle between the first group of geometric features and the x-axis. The coordinate transformation shown in FIG. 5F can be referred to as a clockwise transformation.

Figure 5G:
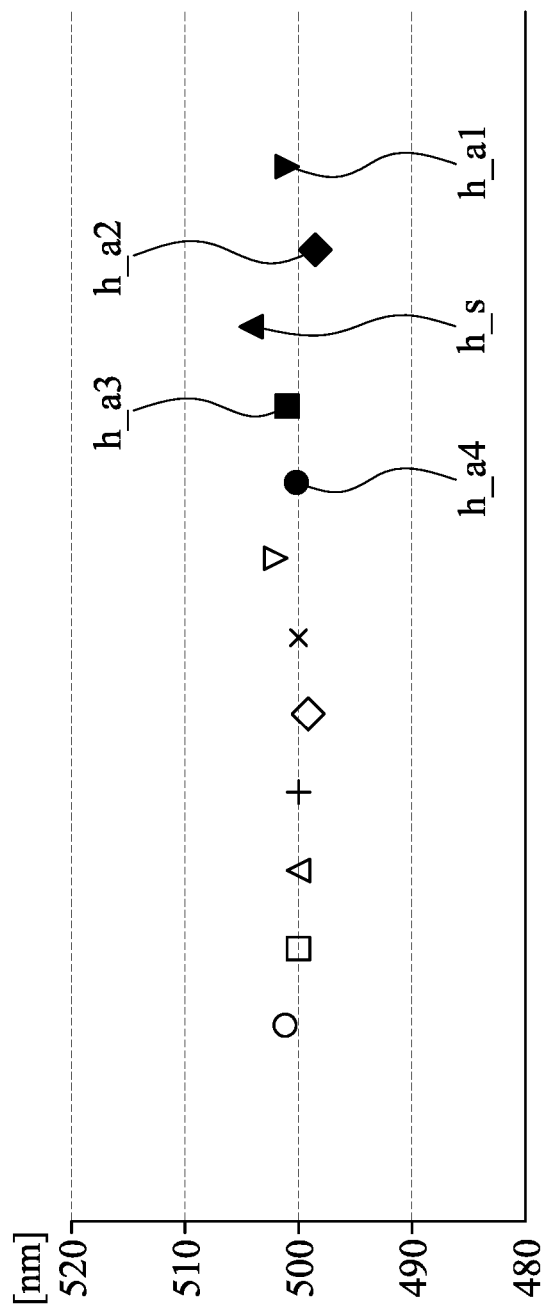
FIG. 5G shows exemplary results of coordinate transformation, in accordance with some embodiments of the present disclosure.

FIG. 5G shows exemplary results of coordinate transformation, in accordance with some embodiments of the present disclosure.

FIG. 5G shows the transformed y coordinate values of the geometric features h_s, h_a1, h_a2, h_a3, and h_a4. As shown in FIG. 5G, the y coordinate value of the geometric feature h_s is obviously higher than the others. In some embodiments, the transformed y is coordinate value of the geometric feature h s can be compared with a predetermined threshold (e.g., a second threshold). If the transformed y coordinate value of the geometric feature h_s exceeds the predetermined threshold, it is determined that the abnormal shift is caused by the manufacturing process "SA."

Figure 5H:
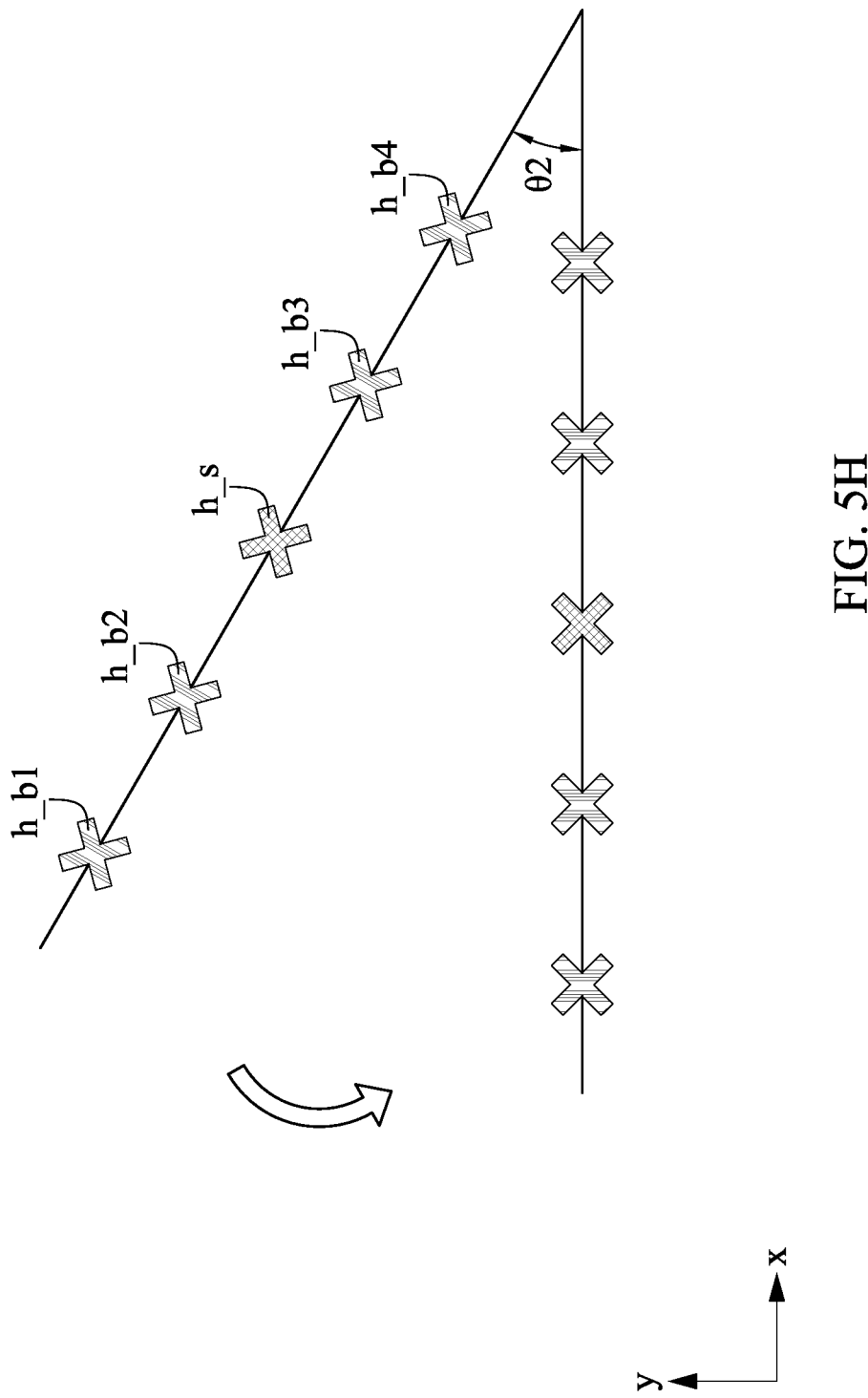
FIG. 5H is an exemplary schematic view of one of various operations for identifying a cause of manufacturing defects, in accordance with some embodiments of the present disclosure.

FIG. 5H is an exemplary schematic view of one of various operations for identifying a cause of manufacturing defects, in accordance with some embodiments of the present disclosure. The operation S418 of FIG. 4B can be better understood in view of the exemplary schematic view of FIG. 5H.

FIG. 5H shows the geometric center of the geometric feature h_s, and several geometric centers of the geometric features h_b1, h_b2, h_b3, and h_b4. The geometric features h_s, h_b1, h_b2, h_b3, and h_b4 are associated with the manufacturing processes "SB." A coordinate transformation is performed on the geometric centers of the geometric features h_s, h_b1, h_b2, h_b3, and h_b4. The coordinate transformation can be performed according to the following equations.

$$x_T = x \times \cos\theta_2 + y \times \sin\theta_2 \quad \text{(Equation 3)}$$

$$y_T = y \times \cos\theta_2 - x \times \sin\theta_2 \quad \text{(Equation 4)}$$

In Equations 3 and 4, x represents a coordinate value on an x-axis, y represents a coordinate value on a y-axis, $x_T$ represents a transformed coordinate value on the x-axis, $y_T$ represents a transformed coordinate value on the y-axis, and θ2 represents an angle between the second group of geometric features and the x-axis. The coordinate transformation shown in FIG. 5H can be referred to as a counterclockwise transformation.

Figure 5I:
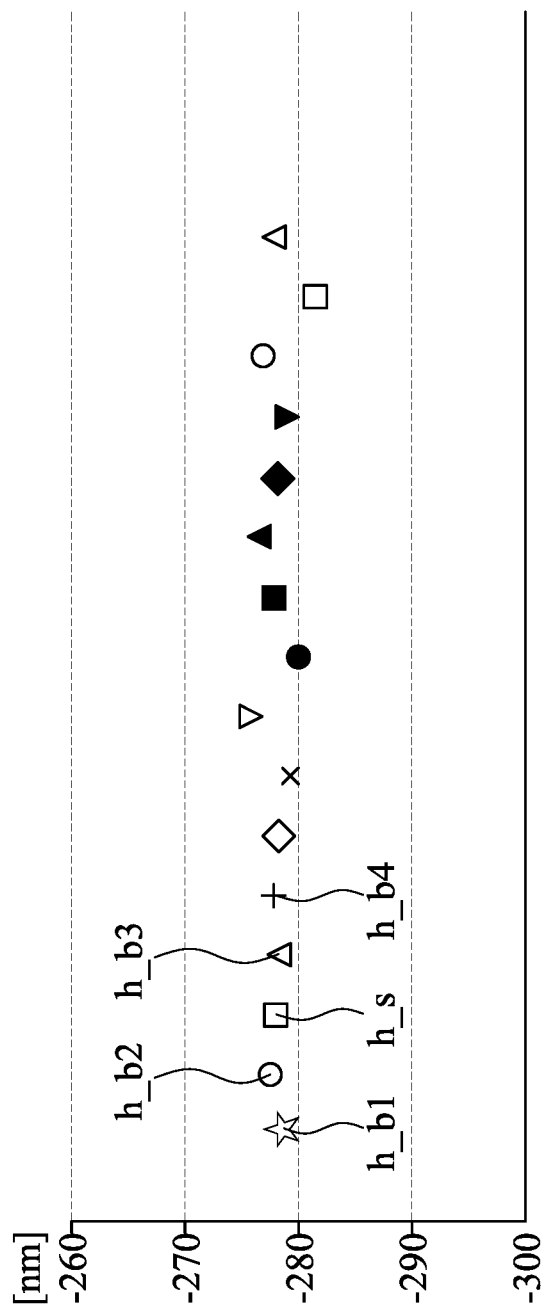
FIG. 5I shows exemplary results of coordinate transformation, in accordance with some embodiments of the present disclosure.

FIG. 5I shows exemplary results of coordinate transformation, in accordance with some embodiments of the present disclosure.

FIG. 5I shows the transformed y coordinate values of the geometric features h_s, h_b1, h_b2, h_b3, and h_b4. As shown in FIG. 5I, the y coordinate value of the geometric feature h_s is in a range similar to the other geometric features.

In some embodiments, the transformed y coordinate value of the geometric feature h_s can be compared with a predetermined threshold (e.g., the second threshold). If the transformed y coordinate value of the geometric feature h_s exceeds the predetermined threshold, it is determined that the abnormal shift is caused by the manufacturing process "SB." In this exemplary embodiment, it can be determined that the abnormal shift is not caused by the manufacturing process "SB."

In some embodiments, the abnormal shift may be caused solely by the manufacturing process "SA." In some embodiments, the abnormal shift may be caused solely by the manufacturing process "SB." In some embodiments, the abnormal shift may be caused by both the manufacturing processes "SA" and "SB."

One aspect of the present disclosure provides a system for identifying a cause of manufacturing defects. The system includes a processing unit and an image capture unit electrically coupled to the processing unit. The system is configured to capture, by the image capture unit, a number N of images covering different portions of a semiconductor wafer, wherein each of the number N of images comprises a number M of geometric features. The system is further configured to specify a number M of serial numbers, each associated with one of the number M of geometric features. The system is further is configured to calculate, by the processing unit, a geometric center for each of the geometric features of the number N of images. The system is further configured to calculate, based on the number N of images, a number M of average geometric centers associated with the number M of serial numbers. The system is further configured to calculate a shift amount for each geometric feature of the number N of images.

One aspect of the present disclosure provides a method for identifying a cause of manufacturing defects. The method comprises capturing, by an image capture unit, a number N of images from a semiconductor wafer, wherein each of the number N of images comprises a number M of geometric features. The method comprises calculating, by a processing unit, a geometric center for each of the geometric features of the number N of images. The method comprises calculating, based on the number N of images, a number M of average geometric centers associated with the number M of geometric features. The method further comprises calculating a shift amount for each geometric feature of the number N of images.

Another aspect of the present disclosure provides a non-transitory computer-readable medium. The non-transitory computer-readable medium stores an inspection program including instructions that, when executed by a processing unit, causes an inspection apparatus to capture, by an image capture unit, a number N of images from a semiconductor wafer, wherein each of the number N of images comprises a number M of geometric features, causes the inspection apparatus to calculate, by the processing unit, a geometric center for each of the geometric features of the number N of images, calculate, based on the number N of images, a number M of average geometric centers associated with the number M of geometric features, perform a first coordinate transformation on a first group of geometric features associated with a specific geometric feature, and perform a second coordinate transformation on a second group of geometric features associated with the specific geometric feature.

The embodiments of the present disclosure disclose a method, a system, and non-transitory computer-readable medium for identifying the cause of manufacturing defects. The disclosed method can identify the location of a specific hole pattern with undesired shift. The disclosed method can provide precise shift amount of the specific hole pattern. Even more, the disclosed method can also identify the manufacturing process that causes such undesired shift. Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, or steps.

What is claimed is:

1. A method for identifying a cause of manufacturing defects, comprising:
    capturing, by an image capture unit, a number N of images from a semiconductor wafer, wherein each of the number N of images comprises a number M of geometric features;
    calculating, by a processing unit, a geometric center for each of the geometric features of the number N of images;
    calculating, based on the number N of images, a number M of average geometric centers associated with the number M of geometric features; and
    calculating a shift amount for each geometric feature of the number N of images based on a difference between the geometric center of a specific geometric feature of the number M of geometric features and the average geometric center associated with the specific geometric feature of the number M of geometric features.

2. The method of claim 1, wherein each of the number N of images covers different portions of the semiconductor wafer.

3. The method of claim 1, further comprising:
    in response to a shift amount of a specific geometric feature exceeding a first threshold, performing a first coordinate transformation on a first group of geometric features associated with a first manufacturing process.

4. The method of claim 3, further comprising:
performing a second coordinate transformation on a second group of geometric features associated with a second manufacturing process.

5. The method of claim 4, wherein the specific geometric feature belongs to the first group of geometric features and the second group of geometric features.

6. The method of claim 4, further comprising:
comparing a y-coordinate value of the specific geometric feature obtained after the first coordinate transformation with a second threshold, and
comparing a y-coordinate value of the specific geometric feature obtained after the second coordinate transformation with the second threshold.

7. The method of claim 6, further comprising:
determining that the shift amount of the specific geometric feature is caused by the first manufacturing process or the second manufacturing process based on:
whether the y-coordinate value of the specific geometric feature obtained after the first coordinate transformation exceeds the second threshold; and
whether the y-coordinate value of the specific geometric feature obtained after the second coordinate transformation exceeds the second threshold.

8. The method of claim 4, wherein the first coordinate transformation is performed according to the following equations:

$$x_T = x \times \cos\theta_1 - y \times \sin\theta_1, \text{ and}$$

$$y_T = y \times \cos\theta_1 + x \times \sin\theta_1$$

wherein
x represents a coordinate value on an x-axis;
y represents a coordinate value on a y-axis;
$x_T$ represents a transformed coordinate value on the x-axis;
$y_T$ represents a transformed coordinate value on the y-axis; and
$\theta_1$ represents an angle between the first group of geometric features and the x-axis.

9. The method of claim 4, wherein the second coordinate transformation is performed according to the following equations:

$$x_T = x \times \cos\theta_2 + y \times \sin\theta_2, \text{ and}$$

$$y_T = y \times \cos\theta_2 - x \times \sin\theta_2$$

wherein
x represents a coordinate value on an x-axis;
y represents a coordinate value on a y-axis;
$x_T$ represents a transformed coordinate value on the x-axis;
$y_T$ represents a transformed coordinate value on the y-axis; and
$\theta_2$ represents an angle between the second group of geometric features and the x-axis.

10. The method of claim 1, further comprising building up a coordinate system for the number N of images, wherein
the coordinate system includes an origin of coordinate positioned at the center of each of the number N of images, and
each of the geometric features includes a coordinate value on an x-axis and a coordinate value on a y-axis.

* * * * *